United States Patent [19]
Patsiokas et al.

[11] Patent Number: 5,063,588
[45] Date of Patent: Nov. 5, 1991

[54] COMMUNICATION SYSTEM PROVIDING AUTOMATIC IDENTIFICATION OF CALLING PARTIES

[75] Inventors: Stelios J. Patsiokas; Brian Keith A. Johnson, both of Plantation; Pierre E. Audet, Oakland Park, all of Fla.

[73] Assignee: Motorola, Inc., Schaumburg, Ill.

[21] Appl. No.: 393,114

[22] Filed: Aug. 4, 1989

Related U.S. Application Data

[63] Continuation of Ser. No. 274,234, Nov. 21, 1988, abandoned.

[51] Int. Cl.⁵ ............................................. H04M 1/57
[52] U.S. Cl. ......................................... 379/57; 379/58; 379/142
[58] Field of Search ....................... 379/58, 142, 59, 57

[56] References Cited

U.S. PATENT DOCUMENTS

| | | | |
|---|---|---|---|
| 4,172,969 | 10/1979 | Levine et al. | 179/2 EC |
| 4,266,098 | 5/1981 | Novak | 179/5.5 |
| 4,495,647 | 1/1985 | Burke et al. | 455/38 |
| 4,468,813 | 8/1984 | Burke et al. | 455/38 |
| 4,658,416 | 4/1987 | Tanaka | 379/57 |
| 4,661,972 | 4/1987 | Kai | 379/57 |
| 4,680,785 | 7/1987 | Akiyama et al. | 379/142 X |
| 4,747,122 | 5/1988 | Bhagnt et al. | 379/57 |
| 4,796,291 | 1/1989 | Makino | 358/58 |
| 4,802,200 | 1/1989 | Murata | 379/57 |
| 4,811,379 | 3/1989 | Grandfield | 379/57 |
| 4,924,496 | 5/1990 | Figa et al. | 379/142 |
| 4,941,167 | 7/1990 | Cannalte et al. | 379/59 |
| 4,942,598 | 7/1990 | Davis | 379/57 |

FOREIGN PATENT DOCUMENTS

| | | | |
|---|---|---|---|
| 3315625 | 10/1984 | Fed. Rep. of Germany | 379/58 |
| 3329267 | 2/1985 | Fed. Rep. of Germany | 379/58 |
| 0191541 | 11/1983 | Japan | 379/58 |
| 0077539 | 5/1985 | Japan | 379/58 |
| 0094547 | 5/1985 | Japan | 379/58 |
| 0081821 | 4/1987 | Japan | 379/58 |
| 0065748 | 3/1988 | Japan | 379/142 |
| 8706421 | 10/1987 | World Int. Prop. O. | 379/142 |

*Primary Examiner*—James L. Dwyer
*Assistant Examiner*—M. Shehata
*Attorney, Agent, or Firm*—Michael J. Budhenhorner, Jr.; Thomas G. Berry

[57] ABSTRACT

The identity of a calling subscriber unit (106) is provided to a called subscriber unit(s) (106') by requiring the calling subscriber to identify itself (112) to a central station (102 and 104a-c) and request across to the communicaiton resources. The central station forwards the identity of the calling subscriber to the called subscriber (114), which enables the called subscriber to decide whether to respond to (answer) the call. If the called subscriber responds, an RF communication link between the two subscriber units is established. Conversely, if the called subscriber does not respond (or responds negatively), the calling subscriber unit is provided with a "Busy" indication. Optionally, the central station may operate as a system-wide message recorder to store messages from calling subscribers for non-responding (Busy) subscribers. In this way, a calling subscriber may leave a message for later retrieval.

18 Claims, 9 Drawing Sheets

COMMUNICATION SYSTEM PROVIDING AUTOMATIC IDENTIFICATION OF CALLING PARTIES

This is a continuation of application Ser. No. 07/274,234, filed Nov. 21, 1988 and now abandoned.

TECHNICAL FIELD

This invention relates generally to radio frequency (RF) communication systems, and more specifically to an RF communication system that automatically provides called parties with the identity of calling parties, and is particularly directed toward an RF communication system that identifies calling parties and provides called parties with an option to either receive the call, or to direct the call to a recording unit.

BACKGROUND ART

Operators of RF communication systems typically charge subscribers a fee to have access to the communication resources. One such fee schedule is based upon the amount of "air-time" used by the subscriber. Since the "air-time" charge is usually quite expensive, it would be useful to subscribers receiving a call to know in advance the calling party's identity. In this way, the called subscriber could decide whether to answer the call.

Even in those RF communication systems that do not charge according to "air-time", it would be useful for subscribers generally to know the identity of party calling them. In this way, the called subscriber may decide whether to answer a call received during a meeting, interview, conference or the like, or during periods when the called party would rather not be interrupted.

Accordingly, it is an object of the present invention to provide an RF communication system that identifies a calling party.

SUMMARY OF THE INVENTION

Briefly, according to the invention, the identity of a calling subscriber unit is provided to a called subscriber unit by requiring the calling subscriber unit to identify itself to a central station (or unit) and request access to the communication resources. The central station forwards the identity of the calling subscriber to the called subscriber, which enables the called subscriber to decide whether to respond to (answer) the call. If the called subscriber responds, an RF communication link between the two subscriber units is established. Conversely, if the called subscriber does not respond (or responds negatively), the calling subscriber unit is provided with a "Busy" indication.

In another aspect of the present invention, the central station operates as a system-wide message recorder to store messages from calling subscribers for non-responding (Busy) subscribers. In this way, a calling subscriber may leave a message for later retrieval.

DETAILED DESCRIPTION OF THE PREFERRED EMBODIMENT

Figure 1:
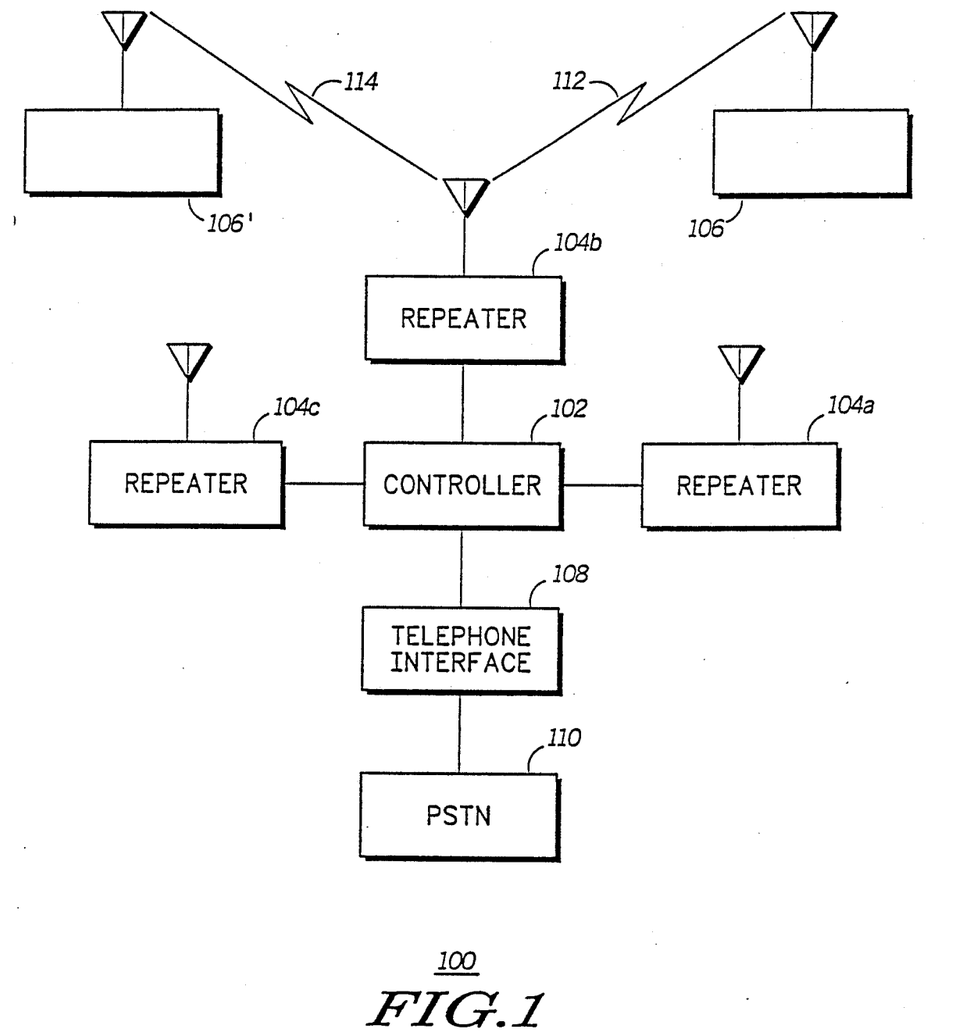
FIG. 1 is an illustration of a communication system in accordance with the present invention.

Referring to FIG. 1, there is shown a block diagram of a communication system 100 in accordance with the present invention. The system 100 comprises a central unit (or station) having a controller 102 coupled to and controlling a plurality of repeaters 104a-104c to facilitate communication between a plurality of subscriber units (two shown). Preferably, the central station also includes a telephone interface 108, which intercouples the controller 102 with a conventional public switched telephone network (PSTN).

To gain access to the communication resources of the communication system 100, the present invention contemplates that a calling subscriber unit 106 will transmit a call request 112 to the central station. Preferably, the call request includes an identification code that is associated with the calling subscriber unit 106, and a code identifying the called subscriber or subscribers. If a communication channel is available, the central station transmits a message 114 to the called subscriber unit(s), which contains the identity of the calling subscriber 106. Upon receipt of the identity of the calling subscriber 106, the called subscriber unit(s) 106' operate to display the identity of the calling subscriber on a display means, while activating an enunciator to inform the subscriber that he or she is being called. After ascertaining the identity of the calling subscriber, each called subscriber may determine whether to answer the call or may decide to transmit a record command to the central station that instructs the central station to store a message for later retrieval. In this way, called subscribers may determine whether to answer a call received during a meeting, interview or conference, or during intervals where the called subscriber does not want to be disturbed except by an important message. Moreover, for those calls that the called subscriber decides not to answer, the present invention provides means for recording and retrieving a message from the central station of the communication system 100.

According to the invention, the central station is interconnected to a conventional public switch telephone network (PSTN) by providing the central station with a telephone interface 108, which is disposed between the controller 102 and the PSTN 110. In this way, conventional telephone parties (interconnect callers) may access the communication system 100 and communicate with subscribers operating within the communication system. To achieve the advantage of the present invention, each interconnect caller is required to transmit an identity code using DTMF codes or other suitable signalling mechanism. The controller 102 receives the identity code of the interconnect caller, and cross references this code to the calling party's identity stored within the controller 102. This identity is forwarded to the called subscriber 106' via the message 114, which enables the called subscriber(s) to display the identity of the calling interconnect party. Of course, this is only effective for those interconnect parties who have been assigned an interconnect identity code that may be cross referenced to an identity stored within the controller 102. To do this, an interconnect caller contemplating use the system (on something more than an infrequent basis) would contact the system operator and receive an assigned interconnect identity code and have this code cross reference to its identity in the controller 102. For those interconnect callers that do not have identity stored in the controller 102, the present invention contemplates allowing communication to commence, although the identity of the interconnect caller cannot be ascertained beyond providing an indication that the calling party is an interconnect party by using a label such as "Telephone Call", or words of similar import.

Figure 2A:
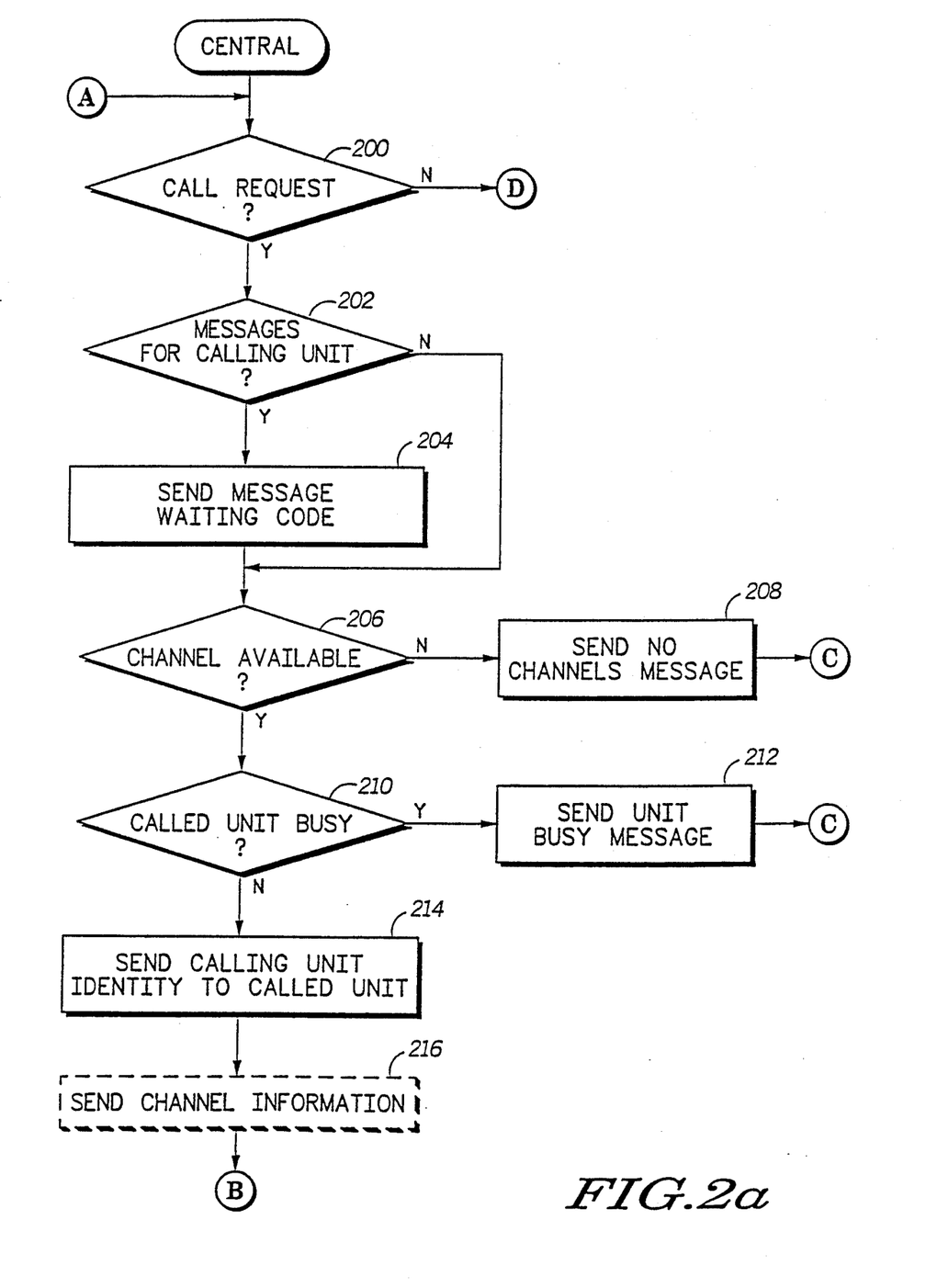
FIGS. 2a-2e are flow diagrams illustrating the operation of the controller of FIG. 1.

Referring to FIGS. 2a–2e, a flow diagram illustrating the operation of the central station (or unit) is shown. In FIG. 2a, the routine begins with decision 200, which determines whether a call request was received from a calling subscriber unit. A negative determination by decision 200 routes control to reference letter D of FIG. 2c. However, if the determination of decision 200 is that a call request has been received, the routine proceeds to decision 202, which determines whether any messages are currently stored within the controller 102 for the calling party. If there are message stored for the calling party, a "Message Waiting" code is transmitted to the calling subscriber (step 204). In this way, subscribers are reminded that messages are waiting at the central station. Of course, the messages need not be retrieved at this time, however, the subscribers are reminded that messages are available for review. Following the transition in step 204, or upon a negative determination of decision 202, the routine proceeds to decision 206, which determines whether a channel is available on the communication system 100. If not, a "No Channel Available" message is sent (step 208), and the routine proceeds to reference letter C of FIG. 2b. If there are channels available, the routine proceeds to decision 210, which determines whether the called subscriber is currently participating in another call, and is therefore busy and unable to respond to the present call request. If the controller 102 determines that the called subscriber is busy, the routine proceeds to step 212, which transmits a "Unit Busy" message to the calling subscriber prior to routing control to reference letter C of FIG. 2b. However, if the called subscriber is not busy the routine proceeds to step 214, where the central station transmits a message 114 containing the identity of the calling subscriber unit. Optionally, the central may send the channel information at this time (step 216), which will enable the called subscriber unit to aptly move to a communication channel to commence communication if so desired. Optionally, as will be made more apparent hereinafter, the channel information may be provided to the called subscriber at a later time to minimize the initial air traffic in the event that the called subscriber does not wish to participate in a call. Following step 214 and the optional step 216, the routine proceeds to reference letter B of FIG. 2b.

Figure 2B:
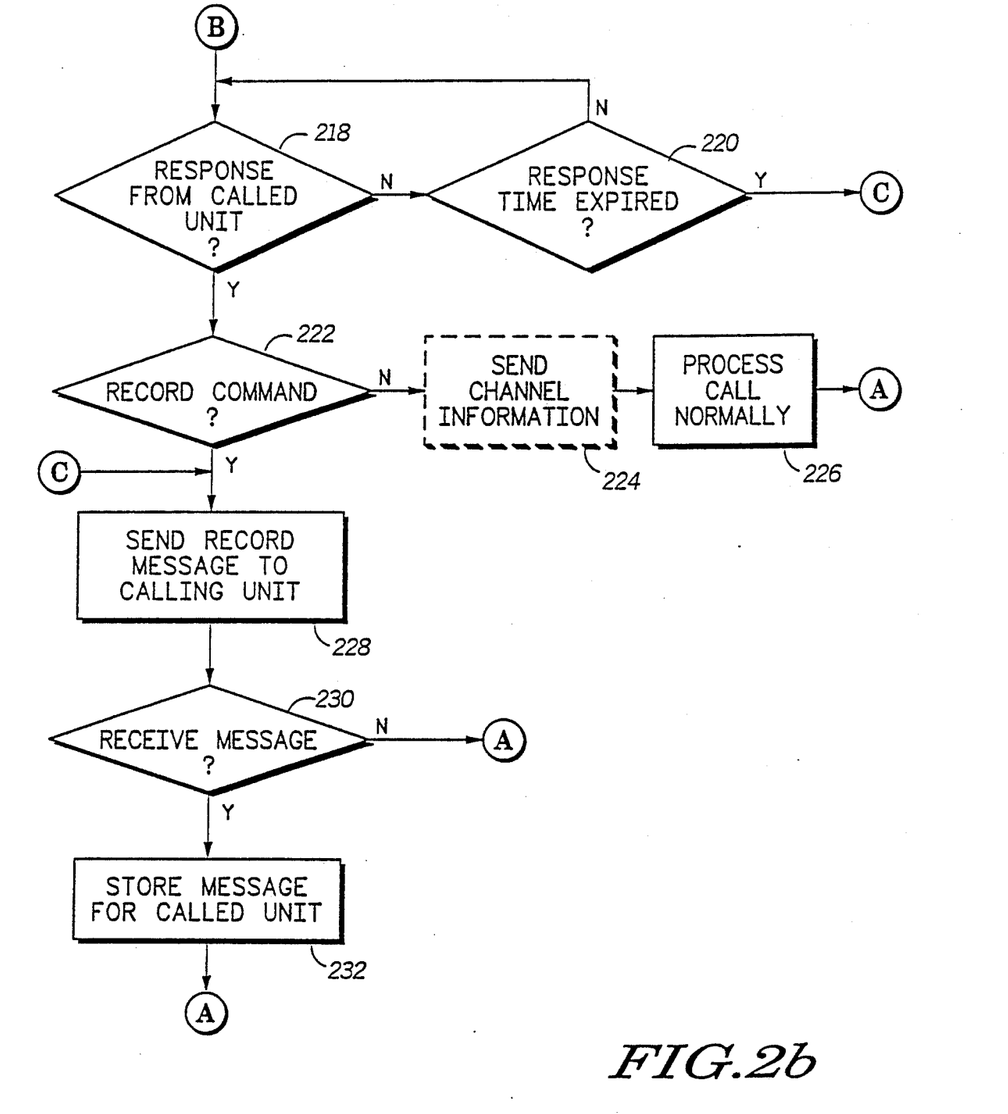

Referring to FIG. 2b, the central station operation continues in decision 218, which determines whether a response from the called unit was received. If not, the routine proceeds to decision 220, which determines whether a predetermined time interval for a response has expired. If not, the central operates in the loop formed by decisions 218 and 220 waiting for a response until the predetermined time has expired. If, however, the determination of decision 218 is that a response was received from the called subscriber, the routine proceeds to decision 222, which determines whether a record command was received in response to transmitting the identity of the calling subscriber unit. If not, the called subscriber will operate to answer the call and communicate with the calling party. To do this, both subscriber units must have the channel information identifying the communication channel upon which to communicate. Therefore, if this information has not been transmitted earlier (such as in step 216) the central transmits the channel information in optional step 224, and thereafter, the central operates to process the call normally (step 226). At the conclusion of the call, the routine proceeds to reference letter A of FIG. 2a.

Assuming, however, that the determination of decision 222 is that a record command was received from the called subscriber, the routine proceeds to reference letter C, which begins with step 228 which sends a "Record Message" command to the calling subscriber unit. This informs the calling subscriber that the called subscriber is busy or unavailable, and provides the calling subscriber with an opportunity to transmit a message that may be later retrieved by the called subscriber. Accordingly, decision 230 determines whether a message was received from the calling subscriber. If not, the routine returns to reference letter A of FIG. 2a. However, if the message was received from the calling subscriber, the message is stored (step 232) prior to returning to reference letter A of FIG. 2a.

Figure 2C:
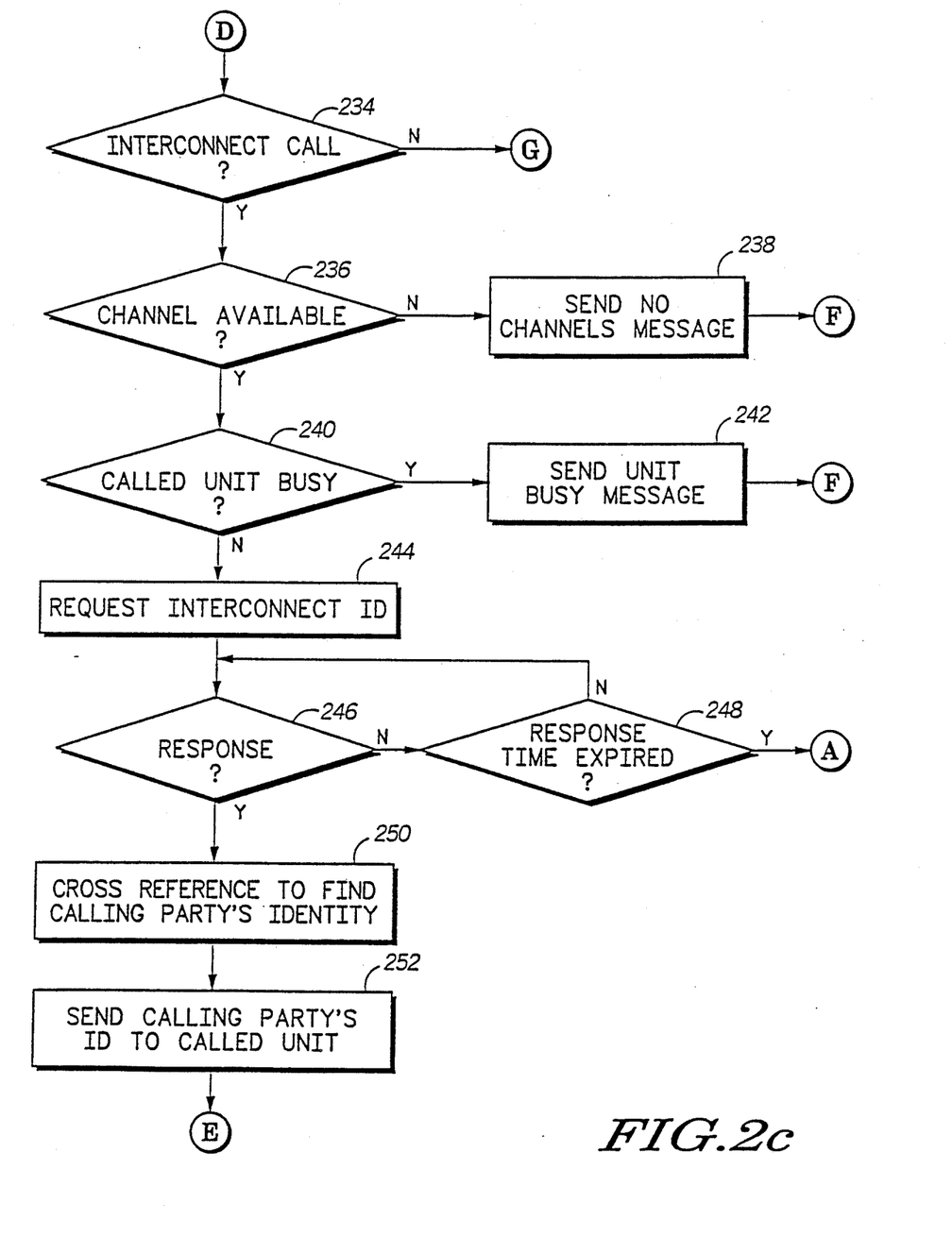

Referring to FIG. 2c, the central station operation continues with decision 234, which determines whether an interconnect call was received from the PSTN network. If not, the routine proceeds to reference letter G of FIG. 2e. However, if the determination of decision 234 is that an interconnect call was received, the routine proceeds to decision 236, which determines whether a channel is available. If not, the central station transmits a "No Channels Available" message (step 238) to the interconnect party prior to routing controls to reference letter F of FIG. 2d. Assuming, however, that a channel was available, the routine proceeds to decision 240, which determines whether the called subscriber unit is currently engaged in another conversation. If so, a "Unit Busy" message is transmitted (step 242) to the interconnect caller prior to proceeding to reference letter F of FIG. 2d. Conversely, if the called subscriber unit is not busy, the routine proceeds from decision 240 to step 244, where the central requests the interconnect ID of the interconnect party. Alternately, decision 240 and step 242 may be omitted so that the routine would proceed directly to step 244. In this way, the calling interconnect party's identity is always sent to the called subscriber (whether Busy or not) thereby allowing the called subscriber to decide whether to terminate a current call to answer the interconnect call. This provides the subscriber units to give priority to an interconnect call over subscriber-to-subscriber calls.

Preferably, any interconnect caller having more than an infrequent need to use the communication system 100, is assigned an interconnect ID from the system operator. This interconnect ID may be cross referenced to the calling party's identity stored in the memory of the controller 102. Therefore, upon receipt of the interconnect ID request of step 244, the interconnect party would transmit its interconnect ID using the telephone's DTMF keypad or other suitable means. Accordingly, decision 246 determines whether a response containing the interconnect ID was received from the interconnect party. If not, decision 248 determines whether a response time interval has expired. A negative determination of decision 248 results in an operational loop comprising decisions 246 and 248, which continues until the conclusion of the time interval. Assuming, however, that a response was received, the routine proceeds from decision 246 to step 250, where the central station cross references the received interconnect ID to find the calling party's identity. In step 252, this identity is transmitted to the called subscriber. Following this, the routine proceeds to reference letter E of FIG. 2d.

Figure 2D:
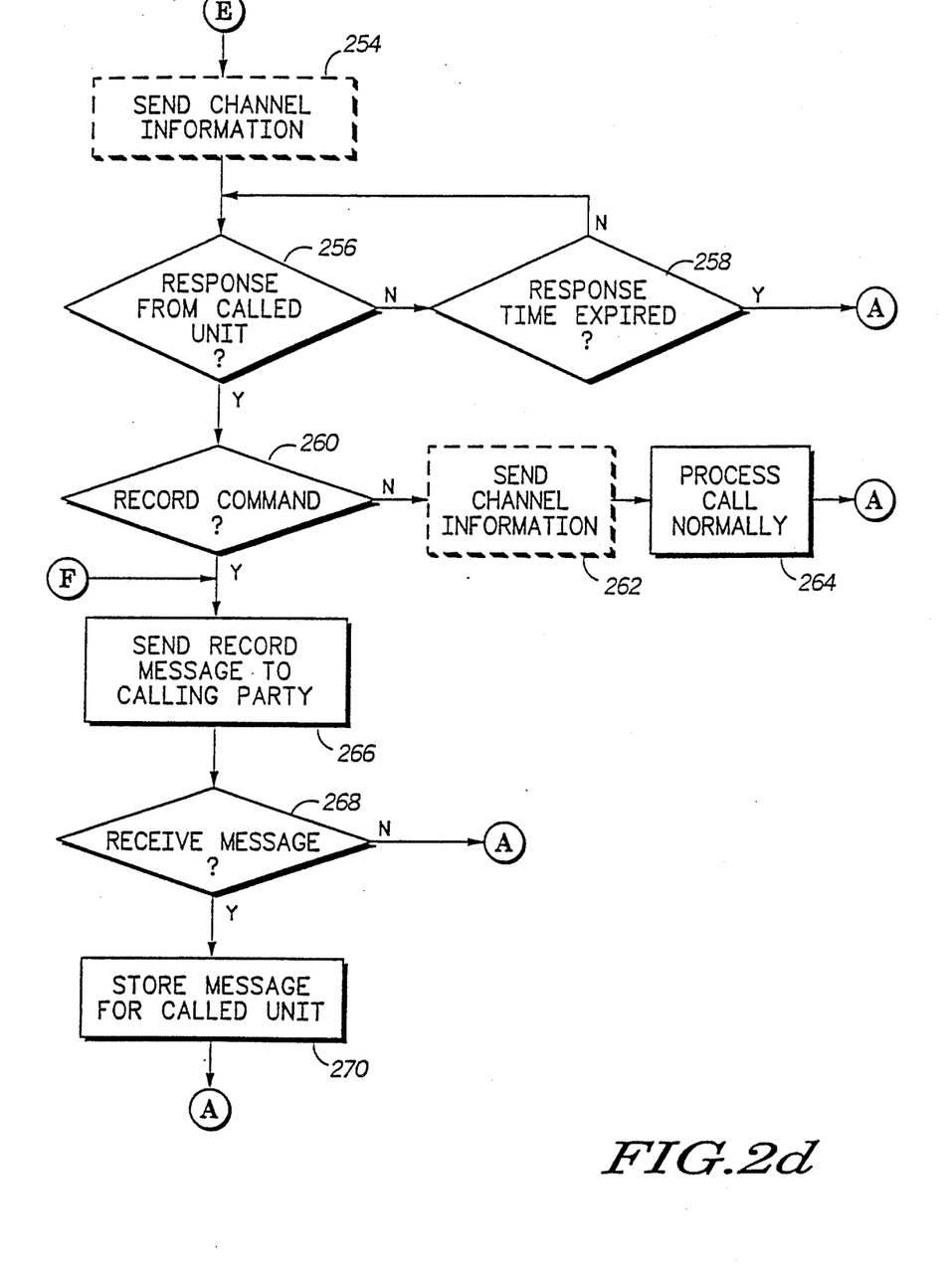

Referring to FIG. 2d, the central station routine continues in step 254, which is an optional step allowing the central station to transmit channel information to the called subscriber so that he or she may rapidly move to the communication channel if communication is desired. Alternately, the channel information may be sent at a later time as will be hereinafter discussed. In any event, the routine continues in decision 256, which determines whether a response received from the called unit. If not, the routine is routed to decision 258, which determines whether the time interval for response has elapsed. If the time interval has not expired, a loop is formed by decision 256 and decision 258, which operates to determine whether a response is received before the expiration of predetermined time interval. If a response was received, the routine proceeds to decision 260, which determines whether a "Record Command" was received from the called subscriber unit. If not, the called subscriber intends to participate in the call with the calling party, and therefore must move to a communication channel to communicate. Accordingly, the central may optionally send the channel information in step 262 (or step 254), after which the central processes the call normally (step 264). At the conclusion of the call, the routing proceeds to reference letter A of FIG. 2a.

Assuming that the determination of decision 260 is that a "Record Command" was received from the called subscriber, the routine proceeds to reference letter F, which begins with step 266 where a "Record Message" indication is transmitted to the calling interconnect party. Preferably, this is done using a voice recording, voice synthesizer or other suitable means to provide a meaningful indication to the interconnect party that he or she may leave a message for the called subscriber. Accordingly, the routine proceeds to decision 268, which determines whether the interconnect caller has transmitted a message to be recorded. If not, the routine proceeds to reference letter A of FIG. 2a. However, if the interconnect caller has transmitted a message to be recorded, the central station stores it in step 270 prior to proceeding to reference letter A of FIG. 2a.

Figure 2E:
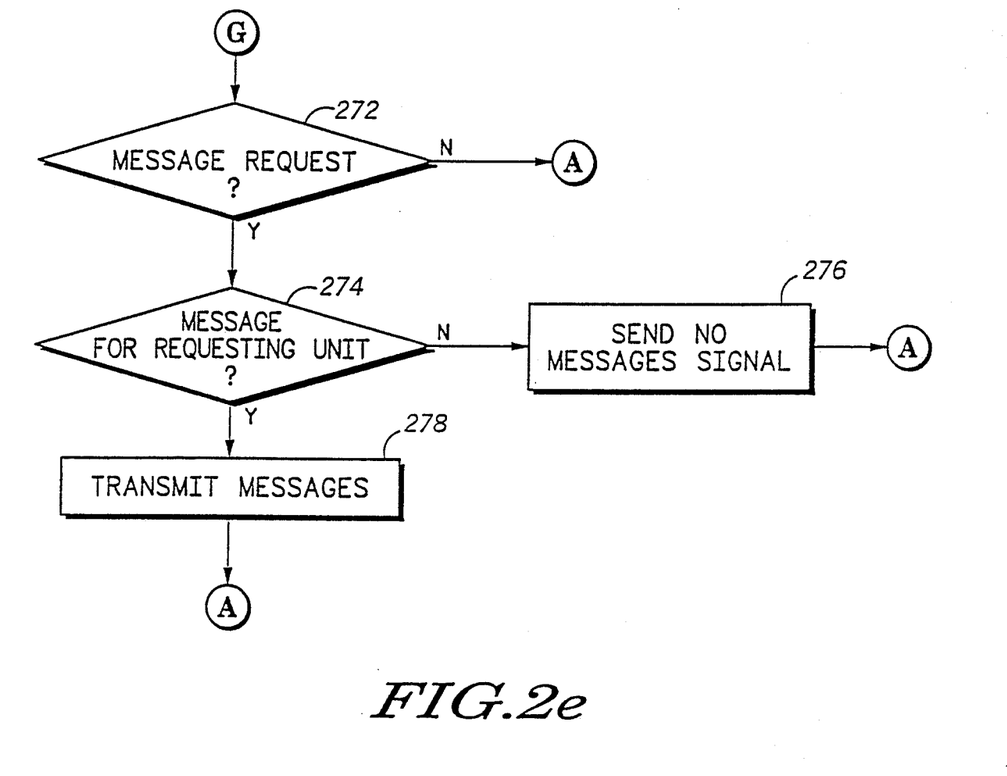

Referring to FIG. 2e, the central station routine continues in decision 272, which determines whether a "Message Request" code was received from any subscriber unit operating within the communication system 100. According to the invention, subscriber units desiring access to the communication facilities are automatically reminded (decision 202 and step 204) of waiting messages. Conversely, a subscriber unit may contact the central station specifically for the purpose of retrieving stored messages. Accordingly, an affirmative determination of decision 272 routes control to decision 274, which determines whether messages are waiting for the requesting subscriber unit. If not, the central station sends a "No Message Waiting" signal (step 276). However, if the determination of decision 272 is that there are messages waiting for this subscriber unit, the messages are transmitted in step 278 prior to returning to reference letter A of FIG. 2a.

Figure 3:
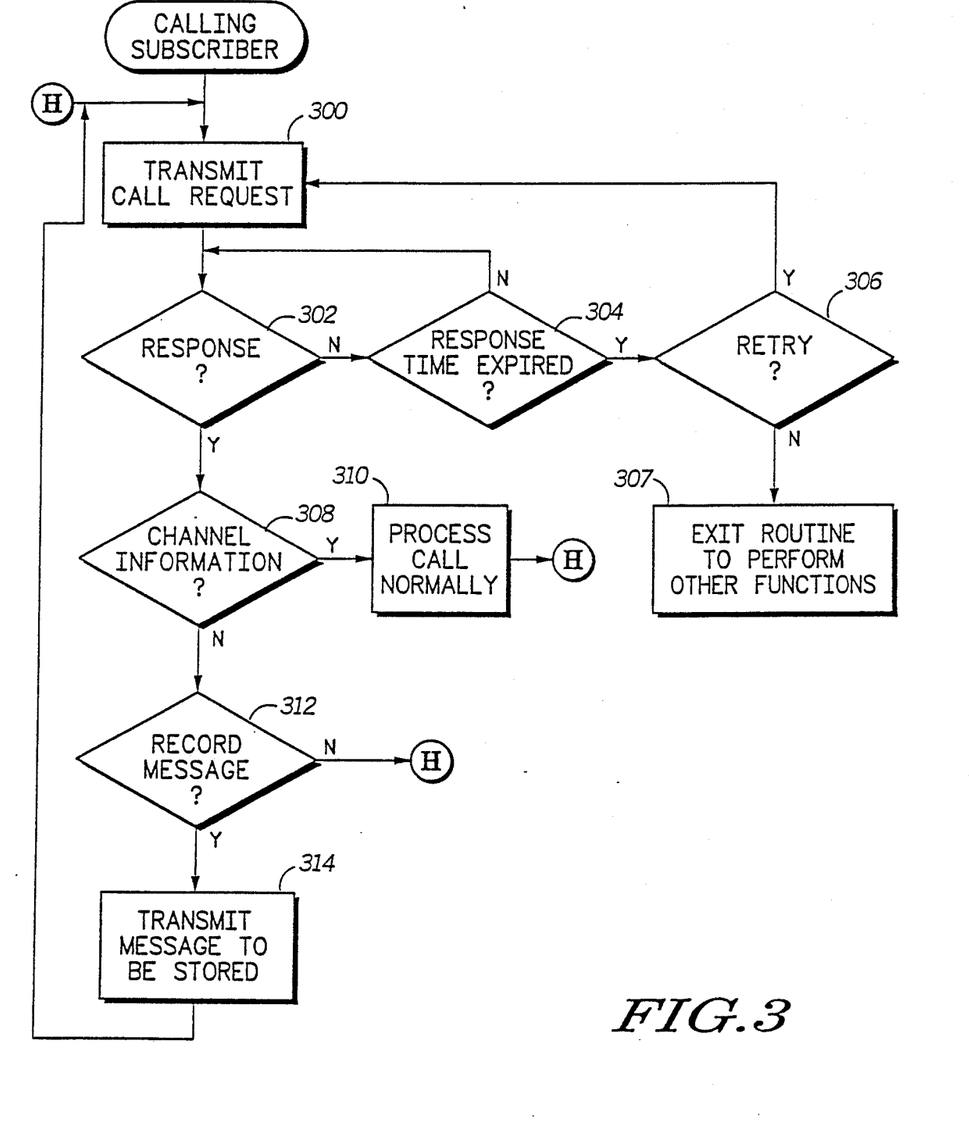
FIG. 3 is a flow diagram illustrating the operation of a calling subscriber unit in accordance with the present invention.

Referring to FIG. 3, a flow diagram illustrating the operation of the calling subscriber unit in accordance with the present invention is shown. The routine begins in step 300, where the calling subscriber transmits a call request to the central station. Preferably the call request comprises the identification of the calling party, the identification of the party to be called, and other signalling or control information as may be appropriate in the communication system. Following this, the routine proceeds to decision 302, which determines whether a response was received from the central station. If not, the routine proceeds to decision 304 which determines whether a response time interval has expired. If not, the routine operates in a loop formed by decisions 302 and decisions 304 to determine whether a response was received within a predetermined time interval. If a response was not received before the expiration of the time interval, the routine proceeds to decision 306, which determines whether a subscriber should retry the call request. According to the invention, each subscriber may retry the call request after waiting an arbitrary time interval to allow excess communication traffic to subside. If the determination of decision 306 is to retry the call request, routine proceeds to step 300, where the call request is again transmitted. However, if the determination of decision 306 is not to retry the routine exits (step 307) and the subscriber unit operates to perform other steps in accordance with its operational program.

Assuming however that the determination of decision 302 is that a response was received, the routine proceeds to decision 308, which determines whether a message containing the channel information was received from the central station. If so, the called party has decided to participate in the call and the call is processed normally (step 310). At the conclusion of the call, the routine proceeds to reference letter H. However, if the determination of decision 308 is that the channel information was not received, the routine proceeds to decision 312, which determines whether a "Record Message" indication was received. A negative determination of decision 312 routes controls to letter H, while an affirmative determination routes control to step 314 where the calling subscriber transmits the message to be stored at the central station. In this way, a message may be provided to the called party at the called party's convenience.

Figure 4:
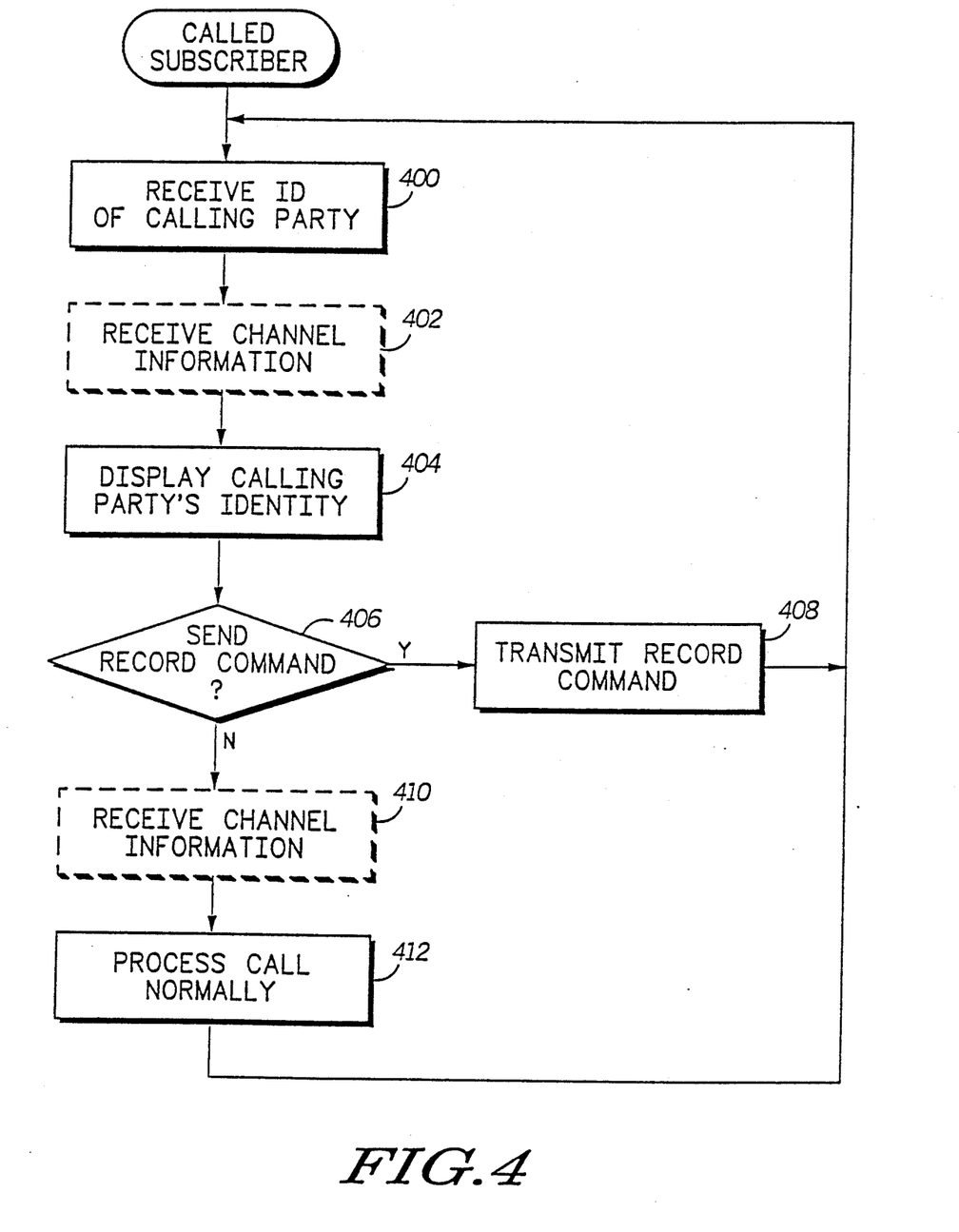
FIG. 4 is a flow diagram illustrating the operation of a called subscriber unit in accordance with the present invention.

Referring to FIG. 4, a flow diagram illustrating the operation of a called subscriber unit in accordance with the present invention is shown. The routine begins in step 400, where the called subscriber receives the identity of the calling subscriber unit. Optionally, the called subscriber may receive channel information at this time (step 402) from the central information. In any event, the called subscriber unit displays the calling party's identity (step 404) so that the called subscriber may determine whether to answer the call. Accordingly, decision 406 determines whether the subscriber has activated a "Record Message" command signal. If so, the routine proceeds to step 408, where a "Record Message" command is transmitted to the central station, which indicates that the called subscriber will not answer at this time, and may receive a recorded message later. Conversely, a negative determination in decision 406 indicates that the called subscriber will receive the call and communicate with the calling party. Accordingly, if the called subscriber unit has not yet received the channel information (such as in step 402) the channel information may be received in step 410 prior to processing the call normally in step 412.

Figure 5:
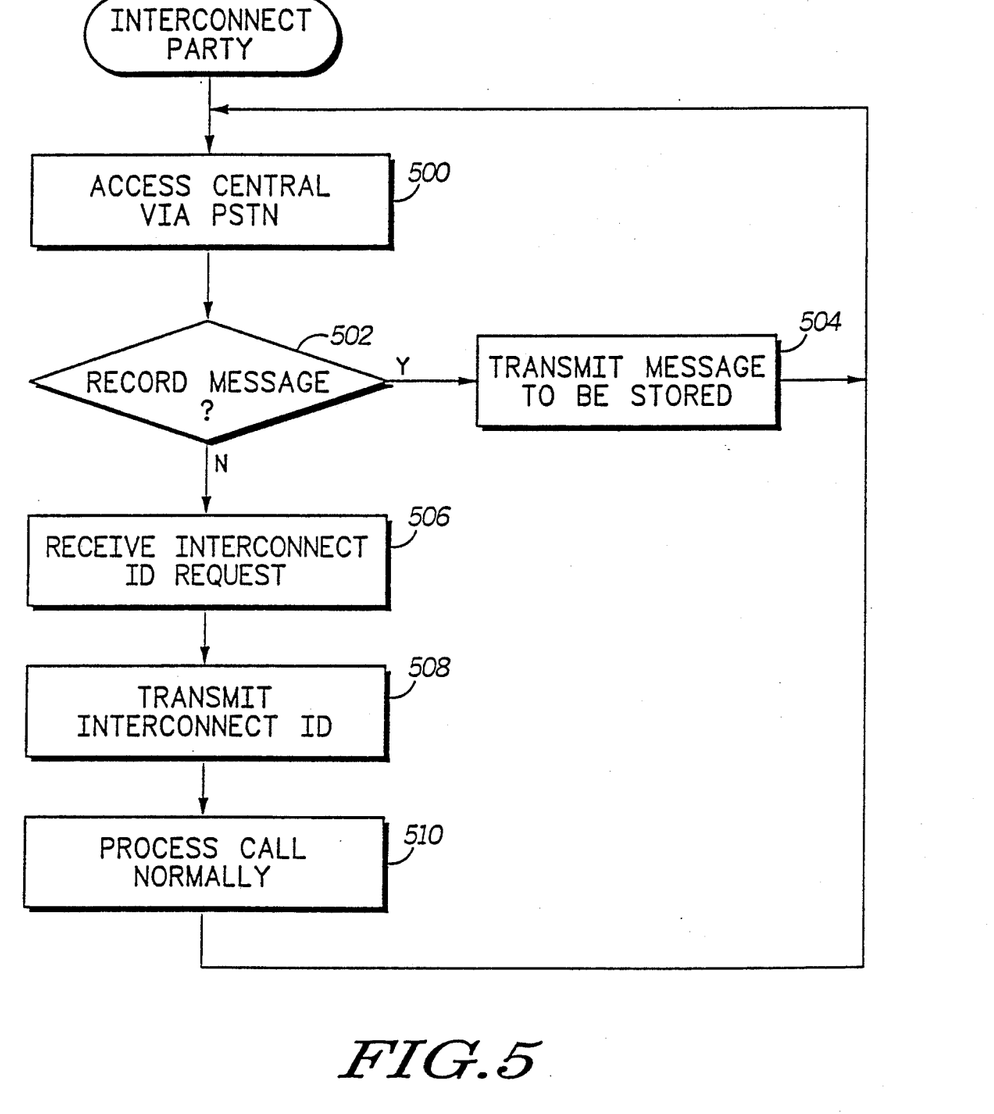
FIG. 5 is a flow diagram illustrating the operation of the present invention as viewed from a conventional telephone (interconnect party).

Referring to FIG. 5, a flow diagram illustrating the operation of the present invention as viewed by a conventional telephone interconnect caller is illustrated. The routine begins in step 500, where the interconnect caller accesses the central station via the PSTN. Decision 502 determines whether a "Record Message" indication has been received indicating either that the system is busy, the called subscriber is busy, or the called subscriber does not wish to answer the call at this time. If a "Record Message" command was received, and the interconnect caller desires to leave a message, the routine proceeds to step 504, where a message is transmitted to be stored for later retrieval by the called subscriber. Conversely, if a "Record Message" command was not received, the routine proceeds from decision 502 to step 506, where the interconnect caller receives a request to transmit its interconnect ID. Preferably, all communication with interconnect parties is accomplished via a voice recording, voice synthesizer, or other suitable means that will provide meaningful voice messages to interconnect parties that may not be fully familiar with the operation of the communication system. Accordingly, the interconnect caller transmits its interconnect ID (step 508) using the telephone's DTMF keypad or any other suitable signalling means. Upon receipt of the interconnect ID, the central station, transparently to the interconnect caller, determines the interconnect caller's identity and transmits it to the called subscriber unit so that the called subscriber may determine whether to answer the call. Conversely, if the interconnect caller does not have an interconnect ID, the present invention permits the interconnect caller to access the communication system, however, the called party may only be provide with limited information (such as "Telephone Caller") regarding the identity of the calling interconnect party. In any event, if the called subscriber answers, the interconnect caller participates in the call normally to its conclusion (step 510).

What is claimed is:

1. In an RF communication system having at least one central unit and a plurality of portable subscriber transceiver units each having a unit identification code associated therewith, a method for identifying a calling subscriber unit to a called subscriber unit, comprising the steps of:

at the central unit:
(a) receiving a call from a calling party;
(b) requiring the calling party to provide its identity code;
(c) determining the calling party's name with the identity code;

at a portable subscriber transceiver unit:
(a) receiving information comprising the calling subscriber unit's name;
(b) displaying said calling subscriber unit's name; and,
(c) operating to communicate with said calling subscriber unit, else transmitting a code to the central unit representing a command for the central unit to record a message from said calling subscriber unit.

2. The method of claim 1, wherein step (a) at the subscriber unit comprises receiving information representing a channel upon which communication may commence.

3. The method of claim 1, wherein step (c) at the portable subscriber transceiver unit comprises receiving information representing a channel upon which communication may commence and operating on said channel to communicate with said calling subscriber unit, else transmitting said code to the central unit representing said command for the central unit to record said message from said calling subscriber unit.

4. The method of claim 1, which includes the central unit's steps of:
(d) transmitting said information representing said calling subscriber unit's name to at least one other subscriber unit; and,
(e) receiving said code representing said command to record said message from said calling subscriber unit.

5. The method of claim 4, which includes the central unit's steps of:
(a1) determining whether messages are stored for said calling subscriber unit; and,
(a2) transmitting a code to said calling subscriber unit indicating that messages are stored and may be retrieved.

6. The method of claim 4, which includes the central unit's step of: (f) transmitting a code to said calling subscriber unit indicating that said message may be recorded from said calling subscriber unit.

7. In an RF communication system having at least one central unit and a plurality of portable subscriber transceiver units each having a unit identification code associated therewith, a method for identifying a calling subscriber unit to a called subscriber unit, comprising the steps of:

at a portable subscriber transceiver unit:
(a) receiving information representing a channel upon which communication may commence and information representing a calling subscriber unit's name;
(b) displaying said calling subscriber unit's name; and,
(c) operating on said channel upon which communication may commence, else transmitting a code to the central unit representing a command for the central unit to record a message from said calling subscriber unit.

8. The method of claim 7, which includes the central unit's steps of:
(a) receiving a code representing a call request from said calling subscriber unit;
(b) transmitting said information representing said channel upon which communication may commence and said information representing said calling subscriber unit's name to at least one other subscriber unit; and,
(c) receiving said code representing said command to record said message from said calling subscriber unit.

9. The method of claim 8, which includes the central unit's step of: (d) transmitting a code said calling subscriber unit indicating that said message may be recorded from said calling subscriber unit.

10. The method of claim 8, which includes the central unit's steps of:
(a1) determining whether messages are stored for said calling subscriber unit; and, (a2) transmitting a code to said calling subscriber unit indicating that messages are stored and may be retrieved.

11. In an RF communication system having at least one central unit and a plurality of portable subscriber transceiver units each having a unit identification code associated therewith, a method for identifying a calling portable subscriber transceiver unit to a called subscriber unit, comprising the steps of:

at a subscriber unit:
(a) receiving information representing a calling subscriber unit's name;
(b) displaying said calling subscriber unit's name;
(c) transmitting a code to the central controller representing a channel request, else transmitting a code to the central unit representing a command for the central unit to record a message from said calling subscriber unit; and,
(d) receiving information representing a channel upon which communication may commence when said code representing a channel request is transmitted to the central unit.

12. The method of claim 11, which includes the central unit's steps of:
(a) receiving a code representing a call request from said calling subscriber unit;
(b) transmitting said information representing said calling subscriber unit's name to at least one other subscriber unit;
(c) receiving said code representing said channel request; and,
(d) transmitting said information representing said channel upon which communication may commence.

13. The method of claim 12, which includes the central unit's steps of:
(a1) determining whether messages are stored for said calling subscriber unit; and,
(a2) transmitting a code to said calling subscriber unit indicating that messages are stored and may be retrieved.

14. The method of claim 11, which includes the central unit's steps of:
(a) receiving a code representing a call request from said calling subscriber unit;
(b) transmitting said information representing said calling subscriber unit's name to at least one other subscriber unit; and,
(c) receiving said code representing said command to record said message from said calling subscriber unit.

15. The method of claim 14, which includes the central unit's step of: (d) transmitting a code to said calling subscriber unit indicating that said message may be recorded from said calling subscriber unit.

16. The method of claim 14, which includes the central unit's steps of:
(a1) determining whether messages are stored for said calling subscriber unit; and,
(a2) transmitting a code to said calling subscriber unit indicating that messages are stored and may be retrieved.

17. In an RF communication system having at least one central unit and a plurality of portable subscriber transceiver units each having a unit identification code associated therewith, a method for identifying a calling subscriber unit to a called subscriber unit, comprising the steps of:

at a portable subscriber transceiver unit:
(a) receiving information representing a calling subscriber unit's name;
(b) displaying said calling subscriber unit's name;
(c) transmitting a code to the central unit representing a command for the central unit to record a message from said calling subscriber unit and alternatively, operating to communicate with said calling subscriber unit;

at the central unit:
(a) receiving a code representing a call request from said calling subscriber unit;
(b) transmitting said information representing said calling subscriber unit's name to at least one other subscriber unit;
(c) receiving said code representing said command to record said message from said calling subscriber unit; and,
(d) transmitting a code to said calling subscriber unit indicating that said message may be recorded from said calling subscriber unit.

18. In an RF communication system having a central unit and a plurality of portable subscriber transceiver units each having a unit identification code associated therewith, said central unit being interconnected with a wireline telephone network for receiving calls from a telephone party, a method for identifying a calling telephone party to a called portable subscriber transceiver unit, comprising the steps of:

at the central unit:
(a) receiving a signal from said calling telephone party;
(b) processing said signal to determine said calling telephone party's name;
(c) transmitting information representing said calling telephone party's name to at least one subscriber unit;
(d) receiving said code representing said command to record a message from said calling telephone party;
(e) transmitting a signal to said calling telephone party indicating that said message may be recorded from said calling telephone party;

at a portable subscriber transceiver unit:
(a) receiving said information representing said calling telephone party's name;
(b) displaying said calling telephone party's name; and,
(c) transmitting a code to the central unit representing said command for the central unit to record said message from said calling telephone party.

* * * * *